(12) United States Patent
Song et al.

(10) Patent No.: US 12,131,266 B2
(45) Date of Patent: *Oct. 29, 2024

(54) MULTIPLE GRANULARITY CLASSIFICATION

(71) Applicant: FORESCOUT TECHNOLOGIES, INC., San Jose, CA (US)

(72) Inventors: Yuzhou Song, San Jose, CA (US); Arun Raghuramu, Milpitas, CA (US); Yang Zhang, Fremont, CA (US)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,959

(22) Filed: May 17, 2023

(65) Prior Publication Data

US 2023/0289631 A1  Sep. 14, 2023

Related U.S. Application Data

(63) Continuation of application No. 16/915,926, filed on Jun. 29, 2020, now Pat. No. 11,694,098.

(51) Int. Cl.
*H04L 9/40* (2022.01)
*G06N 5/04* (2023.01)
*G06N 20/00* (2019.01)

(52) U.S. Cl.
CPC .............. *G06N 5/04* (2013.01); *G06N 20/00* (2019.01); *H04L 63/0227* (2013.01);
(Continued)

(58) Field of Classification Search
None
See application file for complete search history.

(56) References Cited

U.S. PATENT DOCUMENTS

2017/0024660 A1   1/2017  Chen et al.
2020/0007391 A1*  1/2020  Yang ...................... H04L 43/04

FOREIGN PATENT DOCUMENTS

WO   2020005505 A1   1/2020

OTHER PUBLICATIONS

U.S. Appl. No. 18/318,959, filed Sep. 20, 2018, Zhang et al.
(Continued)

*Primary Examiner* — Cai Y Chen
(74) *Attorney, Agent, or Firm* — Womble Bond Dickinson (US) LLP

(57) ABSTRACT

Systems, methods, and related technologies for classification are described. Network traffic from a network may be accessed and an entity may be selected. One or more values associated with one or more properties associated with the entity may be determined. The one or more values may be accessed from the network traffic. A first model associated with a first level of granularity is accessed. A first classification result of the entity based on the first model is determined by a processing device. A second model associated with a second level of granularity is accessed. The second level of granularity is higher than the first level of granularity and the second model is accessed based on the first classification result. A second classification result of the entity based on the second model is determined. At least one of the first classification result or the second classification result is stored.

20 Claims, 7 Drawing Sheets

(52) U.S. Cl.
CPC ........ *H04L 63/102* (2013.01); *H04L 63/1425* (2013.01); *H04L 63/1433* (2013.01)

(56) References Cited

OTHER PUBLICATIONS

International Searching Authority, International Search Report mailed on Oct. 4, 2021 for International Application No. PCT/US2021/037424.

\* cited by examiner

MULTIPLE GRANULARITY CLASSIFICATION

RELATED APPLICATIONS

This application is a continuation of U.S. patent application Ser. No. 16/915,926 filed on Jun. 29, 2020, which is herein incorporated by reference in its entirety.

TECHNICAL FIELD

Aspects and implementations of the present disclosure relate to network monitoring, and more specifically, classification of entities of a network.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
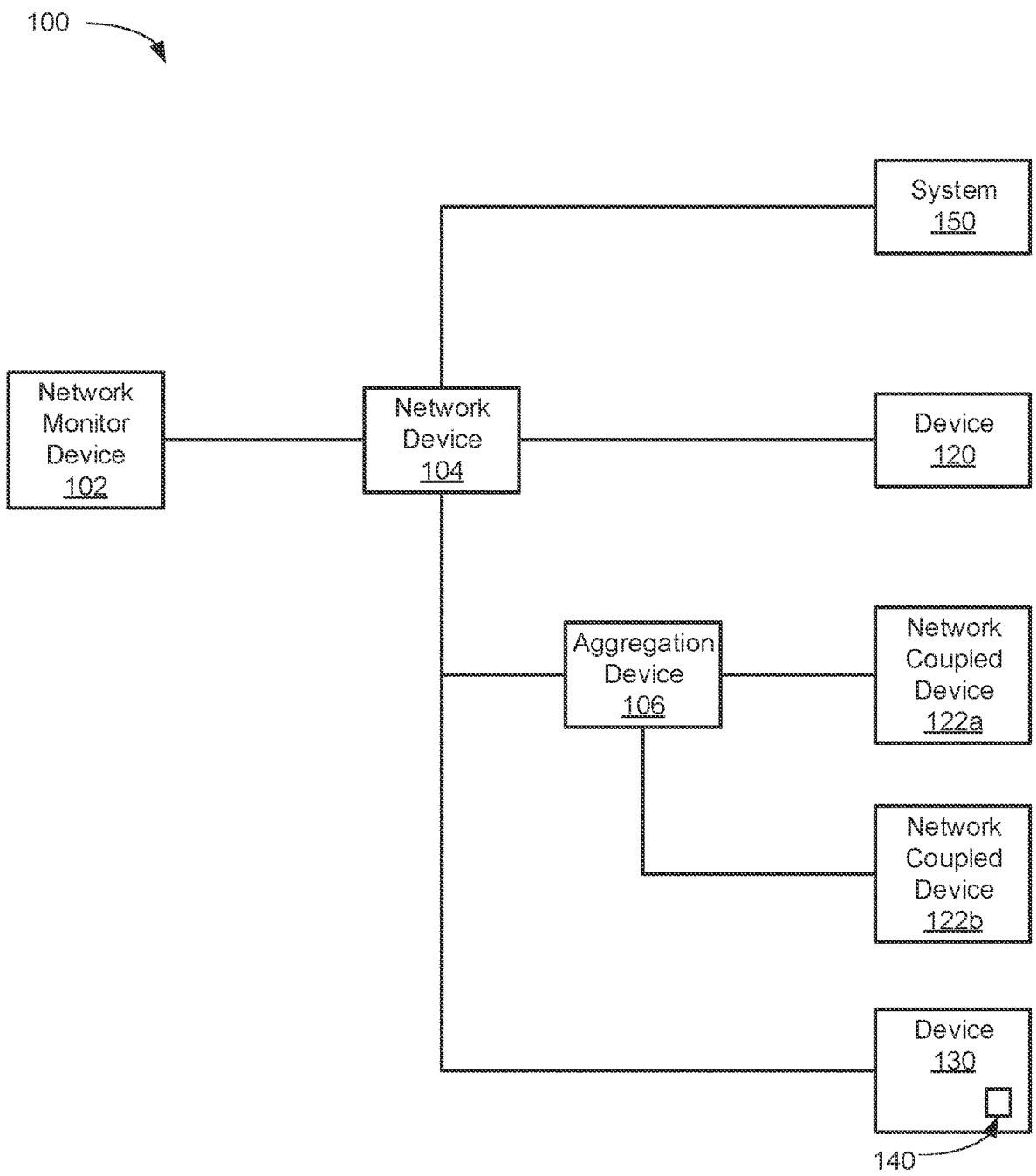
FIG. 1 depicts an illustrative communication network in accordance with one implementation of the present disclosure.

Aspects and implementations of the present disclosure are directed to training and using multiple models (e.g., machine learning models, etc.) to perform classification of entities of a network (but may be applicable in other areas) at various granularities. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained. Classification can be particularly important for securing a network because lack of knowledge about what a device is can prevent application of appropriate security measures. Accordingly, described herein in various implementations are systems, methods, techniques, and related technologies, which allow for improved classification of entities to enable securing of a network including performing one or more policies based on classification of an entity.

Accordingly, described herein in various implementations are systems, methods, techniques, and related technologies, which enable better classification by using multiple models with varying levels of granularity. The usage of multiple models with varying levels of granularity enables overcoming various problems including imbalanced labels, hierarchical labels, and discrepancies in property distribution. Embodiments may overcome these problems while improving performance and reducing resources used for classification.

Entity or device visibility becomes more and more important as the number of devices and diversity of devices increases. Detecting or discovering devices in a network is likely not enough to protect the network. With the increasing number and diversity of devices, classification can increasingly need more resources such as storage, processing capabilities, etc. For example, local computing resources may limit or slow usage of increasing complicated and large machine learning (ML) models.

The current profile based classification of known devices may provide classification for approximately 90% function and 75% operating system (OS) coverage. The benefits of the current profile based classification are accuracy, being deterministic, and human expert knowledge. The limitations of the current profile based classification include labor intensive profile generation to maintain coverage, without a profile match there is no classification of a device, zero/low tolerance to absence of properties used in a profile, and being difficult to maintain (e.g., conflicts may be introduced when adding profiles to an already large knowledge base).

Machine learning for classification has many benefits including fully automated device classification, potential classification of previously unseen devices, less sensitivity to presence of exact property values, and focused effort to increase coverage. However, a barebones approach where machine learning algorithms are provided with existing information will have limited applicability for real world deployment. This is in part due to the skewed distribution of labels of the training data. For example, training data with a substantially large percentage of information technology (IT) devices and relatively few operational technology (OT) devices will have trouble accurately predicting OT devices due to a large imbalance of the data toward IT devices.

Previous ML approaches have had several problems. Previous ML approaches ignored imbalanced labels, discrepancies of property distribution, and hierarchical labels. Imbalanced labels are caused by a sample quantity bias. For example, if training data has 100 samples of computers and ten samples of printers, a trained model may be much more likely to predict a computer over a printer. Previous ML approaches are also memory and CPU intensive with large amounts of passing message traffic.

The hierarchy of classification labels further add challenges as the current profile approaches which may result in an unknown classification results based on being unable to classify a device to a fine enough granularity required by a threshold. For example, the current profile approach may require exact matching of properties of a device to a particular granularity to get above a threshold to classify a result as other than unknown. This means that classification of a vendor or model of a device may be unknown when the device could be classified as at some level (e.g., device type), which would be actionable and useful to a user.

The hierarchies of the classification labels currently used for classification may also create a challenge. The large numbers of classification labels in the hierarchies results in a universal or single classification model for many granularities of classification will have limited ability to make accurate predictions, especially for rare types of devices. The model training time and memory consumption is also very high with too many unique labels.

Embodiments include a methodology to handle the limitations in the training data and the way the labels are organized for prediction (e.g., by machine learning models). Embodiments may be used with classification taxonomy for devices or entities or more general taxonomies including those that are hierarchical in nature. Embodiments include models trained for multiple granularities thereby allowing more granular classification. Embodiments may be used with hierarchies of classification labels used for classification and with a taxonomy tree that uses taxonomy trees for function, operating system (OS), and vendor. The taxonomy for operating system may include a particular operating system (e.g., Windows™, Linux, MacOS™, etc.), versions of each operating system, and patch level or service pack level.

Embodiments may use various models organized in a hierarchy where higher levels of the hierarchy represent more general categories of classification and lower levels in the hierarchy represent more specific categories of classification or finer or increased granularity.

Embodiments use multiple models to handle classification at different granularities thereby overcoming the limitations of a universal classification model which may have limited ability to make accurate predictions at various granularities. For example, embodiments can increase function and OS classification coverage by accurately predicting unknown devices using machine learning as a supplement to profiles. The models can be custom trained for a particular granularity level of classification to enable more accurate predictions above associated thresholds for the associated granularity.

Embodiments are thus able to break down a large problem of classifying an entity into smaller parts. Each part can be focused on by a particular set of one or more models. In solving each of the smaller parts and in determining a classification for that layer (e.g., granularity layer), embodiments are able to have more flexibility for determining, predicting, or inferring a fine gained classification (e.g., leaf node of a classification tree) of an entity.

Embodiments can thereby focus on various trees of classification with one or more models for each layer of granularity of each tree. A classification tree for function can have a top or higher layer of IT or OT to represent that an entity can be classified as IT or OT with respect to function. A second layer of the classification tree can have a model for determining or classifying whether an IT entity is a network entity (e.g., switch, router, firewall, access point, etc.), a mobile entity (e.g., smartphone, laptop, etc.), a relatively fixed or non-mobile computing entity (e.g., a server, a desktop, etc.), a printer, a phone (e.g., voice over internet protocol (VOIP) phone), a scanner, a computer accessory, etc. The second layer of the tree can have a model for determining or classifying whether an OT entity is a financial entity, healthcare entity, or industrial entity. Embodiments may use a separate model for each layer of the tree (e.g., IT or OT) or multiple models for a layer. For example, a second layer model for determining or classifying whether an IT entity is a network entity, a mobile entity, a fixed entity and another second layer model for determining or classifying whether an OT entity is a financial entity, healthcare entity, industrial entity, a manufacturing entity, etc.

Embodiments can thus use multiple models to perform classifications at various or different granularities. Stagewise classification decisions may be made thereby allowing better fidelity of classification and control of the classification process. This allows an improvement in classification over traditional classification which can result in lower confidence of classification at increasingly finer grained layers of classification. For example, embodiments may be able to classify an entity as an IT entity above a confidence threshold, which can allow one or more polices to be applied, while a more traditional classification methodology may output a very low confidence classification below a threshold that the entity is a printer, which may then not be actionable.

Embodiments further support having a confidence threshold associated with each layer (or granularity) or each model of a layer. For example, for function classification a first layer of granularity (e.g., IT or OT) may have a threshold of 95% which if met then allows classification at an increased granularity (e.g., IT function of an entity, e.g., printer) to be determined or inferred. The thresholds for each model may be calibrated during training, user customizable, or any combination thereof. Embodiments thus allow more points of control for ensuring accuracy (e.g., throughout the classification tree). This may allow for stricter false positive rates and false negative rates.

The training of the various models may be based on labeled data that can include entity or device fingerprints, entity or device profile libraries, human expertise, heuristics, labels from users (e.g., where a user enters a classification of an entity), etc. Embodiments may use or select various portions of the labeled data for training models to classify an entity at various levels of granularity. For example, for training a model for classification based on function, the model may be trained with labeled data that is labeled for function. The function labels may be associated with various properties (e.g., DHCP properties, p0f properties, Nmap properties, HTTP user agent, etc.) of an entity that are associated with particular function. As another example, for training an operating system model (e.g., for predicting or classifying an operating system of an entity) data labeled with operating system labels may be used. The OS labels may be associated with various properties (e.g., DHCP properties, p0f properties, Nmap properties, HTTP user agent, etc.) of an entity that are associated with particular operating systems.

Embodiments use stage-wise modeling which leverages the natural hierarchical label structure to mitigate the problems of imbalanced labels, reduce the number of classes of labels in each stage model, and provide easy to control accuracy/coverage by enabling adjusting output thresholds for each stage. The imbalance of labels can originate from labeled data having an imbalance in the number of samples of labeled data. This is caused by an imbalance of the types of devices in many environments. For example, an enterprise may have way more computers than X-ray machines or printers. This creates an imbalance in the data, for instance, 80% of the data is for computers and the remaining 20% is divided among many other different types of devices. Embodiments solve this problem by determining, e.g., with a first model or stage, if an entity is an IT or OT entity. If an entity is an OT entity, then an OT model that was trained on OT labeled data can be used to further classify the OT entity at a finer granularity. The OT model would be trained with OT data such that it is not subject to effects of the imbalance of labels due to 80% of the data being for IT entities. Embodiments further allow for a threshold (e.g., a confidence threshold, accuracy threshold, true positive rate threshold, similarity threshold, score threshold, etc.) to be applied that is specifically for a model trained on OT data as compared to a threshold that would be used with a model trained on the imbalanced labeled data that is a majority IT data.

As another example, for operating systems, many enterprises may have a majority of Windows™ devices and in comparison relatively few Linux and MacOS™ entities or devices. Embodiments may use a first model to determine whether an entity is has a Windows™, Linux, or MacOS™ operating system and the use a second model trained specifically to the operating system determined using the first model to determine the version of the operating system of the entity.

For feature extraction, embodiments can use domain knowledge (e.g., a model customized for classification granularity level) to increase efficiency without losing accuracy. A features may be one or more properties which when combined represent a feature of an entity. A property may be associated with one or more features. A feature can be a keyword or a keyword count. A feature may be a set of distinguishing characteristics for each class of an entity. The domain knowledge can include keywords (e.g., select or predefined keywords) that have been determined to be useful for classification (e.g., by a researcher, profiles, models, etc.). For example, keywords may be used to select property values from an Nmap string associated with one or more entities. Keyword counts may also be used as data for training classification models and classifying entities. This allows selection of information that is relevant to classification putting it in numerical form which can then be used for training (e.g., of a model). The use of domain knowledge can thus refine the data that is used (e.g., provided to a model) for training a classification model and the data used for performing a classification.

Embodiments may use one or more optimization techniques to use fewer properties while increasing efficiency without losing accuracy. The optimization techniques can include training a model on the properties available in an unknown set of entities. The known set of devices or entities is a set of entities where enough properties (e.g., as property key value pairs) are available for classifying the entities. The set of unknown devices may have fewer properties or less relevant properties available as compared to the known set. For example, a known set of entities will likely have more available properties (e.g., user agent, open ports, data from switches or other network infrastructure, Nmap, DHCP, MAC address, DNS, etc.) than an unknown set of entities (e.g., which might have MAC address and vendor while not having Nmap, DHCP, and DNS properties). As another example, if a set of known devices has 7-10 properties available, an unknown set of devices may have one, two, or three properties available. Embodiments may train a model at a granularity level based on data from the known set of entities. For example, a model at a particular granularity level may be trained based on properties that are more readily available in the unknown set. The training of the model based on the more available properties in the unknown sets enables models trained by embodiments to provide classification where prior classification methodologies are not able to provide classifications (e.g., due to bias caused by training only on the known set). Embodiments are well suited for using real data, including properties available in the unknown set, thereby reducing bias because the models and classifications from the models trained by embodiments have been trained on properties available in the unknown set. This can further accelerate development of models by yielding better results. Embodiments thus use both real known and unknown samples to get less biased results. In some embodiments, the classification may further be based on additional information (e.g., external data from one or more webpages from the Internet).

Using prior best effort classification for predicting a device, there is no control for the user to decide what granularity a device is classified to depending on an accuracy threshold. For example, a prior best effort approach may result in unknowns because the model does not support predictions at a level of granularity beyond the granularity the model was trained for. In other words, when a model at the second layer has only seen three types of OT devices but is presented with a fourth type, it will likely predict one of the three types that it has seen resulting in an inaccurate prediction. Embodiments overcome this by training models using an unknown set. This training allows the model to effectively have an other classification instead of being biased toward determining a classification of the classifications in the labeled data. For example, if the labeled data includes three types of OT entities, then a model trained on that data will likely be biased to determine a classification as one of the three types of OT entities in the labeled data. This can include classifying a fourth type of OT entity as one of the three types of entities in the labeled data. The use of the unknown or other classifications allows embodiments to train a model that is less or not biased toward the classifications of the labeled data.

Embodiments have better resource utilization including reduced memory and processing (e.g., central processing unit (CPU) or graphics processing unit (GPU)) resource consumption and less message passing. The use of models at increasing finer granularities means that more specific models are used with fewer properties and more specific sets of labeled data. The use of more specialized models uses less processing resources and uses less memory for training, classification, or a combination thereof. In some embodiments, a smaller number of features or a smaller number of high impact features are used in training of a model and classification. The specialized models used by embodiments may use a smaller number of features as compared to more general models. Embodiments may thus use a smaller number of properties featurized in a unique way to enable better classification.

The use of more specialized or finer granularity models further allows a reduced amount of message passing between cores of a processor (e.g., CPU or GPU) due to the models being simpler and the amount of training data being more specialized and thereby smaller (e.g., due to training to be a finer grain model). Embodiments can thus reduce hardware or compute requirements due to reducing processing and memory resources used and reduce the amount of message passing (e.g., message passing between cores of a CPU or GPU) for training and classification.

Embodiments advantageously enable benefits including higher accuracy and higher confidence classifications using models configured for classification at various granularities. Embodiments advantageously use stage based or increasing granularity classification models to overcome issues of imbalanced labels, discrepancies in property distribution, and hierarchical labels. The stage based classification models consume less resources (e.g., processing and memory) than a single universal classification model. The stage based models may be configurable to have a threshold (e.g., confidence threshold) set for each level or granularity to allow accuracy at multiple levels of granularity. The stage based models further enable the flexibility of customized classification granularity based on a user's configuration (e.g., based on a user configuring one or more confidence thresholds). For example, confidence thresholds at each level of granularity may be configured (e.g., during training, by a user, or a combination thereof).

Accordingly, described herein in various implementations are systems, methods, techniques, and related technologies, which may perform classification, training of models for classification, or a combination thereof. As described herein, various techniques can be used to perform classification at various levels of granularity and train models for use in classification at various levels of granularity.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, other network devices, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its devices and the amount of work or labor involved in configuring network devices.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service). Embodiments are able to dynamically (e.g., on the fly or responsive to changing conditions, for instance, an entity being communicatively coupled to a network or in response to determination of characteristics of an entity) control access of various entities or micro-segment various entities, as described herein.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including determining one or more properties, one or more classifications at various granularities, security actions, as described herein. Network monitor device 102 can perform the classification using one or more models each with an associated granularity to provide more efficient and accurate classification. A confidence may be determined with each classification and compared with a threshold (e.g., confidence threshold) associated with the model to determine if further another classification (e.g., at another level of granularity) should be determined. In some embodiments, network monitor device 102 can use local resources (e.g., processing, memory, data resources, or other resources), cloud resources, or a combination thereof for performing the classifications. In various embodiments, the classifications from one or more models may be combined with one or more classifications based on a profiles, fingerprints, etc., as described herein.

Network monitor device 102 may further train the one or more models for use in determining or inferring the one or more classifications. Each model may be trained on a select data set (e.g., IT data, OT data, OS data, etc.) to classify an entity at a granularity level, as described herein. The trained models may be deployed locally, in the cloud, or a combination thereof for classification by one or more network monitor entities.

Network monitor device 102 can determine one or more enforcement points where the entity is communicatively coupled to the network and thereby determine the one or more enforcement points closest to the entity. For example, network monitor device 102 may access information on a switch (e.g., a switch cache) to determine a port (e.g., physical port, wireless port, or virtual port) where an entity with a particular IP address or MAC address or other identifier is communicatively coupled. Network monitor device 102 may also access information from a wireless access point where the entity is communicatively coupled. In some embodiments, network monitor device 102 may poll information from a cloud service to determine where an entity is communicatively coupled or connected to a network. In various embodiments, network monitor device 102 access syslog or SNMP information from an entity itself to determine where an entity is communicatively coupled or connected to a network (e.g., without accessing information from a network entity or enforcement point). Network monitor device 102 supports applying access policies in situations where an entity is communicatively coupled to a network with more than one connection (e.g., a wired connection and a wireless connection).

Based on the enforcement point, network monitor device 102 determines the one or more access rules to be assigned to the one or more enforcement points based on an access policy. In some embodiments, based on information about the one or more enforcement points closest to the entity, network monitor device 102 translates the access policy into one or more commands that will be used to configure the access rules on the one or more enforcement points. The closest enforcement point to an entity can be enforcement point where the entity is communicatively coupled. The enforcement point may be network device or network infrastructure device closest in proximity (e.g., physical proximity) to the entity. The enforcement point comprises the port where the entity is communitive coupled to the network, and communication to and from the entity is sent first through that port. In some embodiments, the port of the enforcement point is the last point of communication within network infrastructure before communication is sent to the entity. In various embodiments, the closest enforcement point is where communication from the entity is initially sent when communications are sent from the entity (e.g., prior to communications with the network backbone or Internet backbone). For example, the closest enforcement to an entity connected to a switch is the switch. As another example, the closest enforcement point to an entity wirelessly communicatively coupled to a wireless access point is wireless access point. In various embodiments, network monitor device 102 may access the current configuration of the one or more enforcement points to determine the access rules (e.g., ACLs) that are to be applied to the one or more enforcement points, as described herein. In some embodiments, an entity is communicatively coupled to a wireless controller via a wireless access point and the wireless controller or a switch is the closest enforcement point (e.g., based on the wireless controller or the switch being able to apply access rules, for instance ACLs, to communications of the entity, for instance, in the case where the wireless access point is not able to or does not have the functionality to apply access rules). In various embodiments, an entity is communicatively coupled to a layer 3 switch via a layer 2 switch and the layer 3 switch is the closest enforcement point (e.g., based on the layer 3 switch being able to apply access rules, for instance ACLs, to communications of the entity, for instance, in the case where the layer 2 switch is not able to or does not have the functionality to apply access rules).

Network monitor device 102 may then apply or assign the access rules to the one or more enforcement points closest to the entity. Network monitor device 102 may communicate the access rules via application programming interfaces (APIs), command line interface (CLI) commands, Web interface, simple network management protocol (SNMP) interface, etc. In some embodiments, network monitor device 102 may verify that the one or more enforcement points have been properly or correctly configured based on the access rules.

Network monitor device 102 may provide an interface (e.g., a graphical user interface (GUI)) for viewing, monitoring, and modifying classification or associated thresholds associated one or more models, as described herein. Network monitor device 102 may further monitor network traffic over time to reclassify entities as new entities join the network, entities rejoin the network, and new models are made available.

Network monitor device 102 may further perform a variety of operations including identification, classification, and taking one or more remediation actions (e.g., changing network access of an entity, changing the virtual local area network (VLAN), sending an email, sending a short message service (SMS) message, etc.).

An enforcement point may be a router, firewall, switch, hypervisor, software-defined networking (SDN) controller, virtual firewall, or other network device or infrastructure that may have an ACL like or rule like policy or functionality to apply based on the port where an entity is communicatively coupled thereto. Enforcements points may also be a next generation firewall (NGFW) and cloud infrastructure. A NGFW can be updated with an ACL like policy regarding an entity accessing the Internet. Cloud infrastructure (e.g., amazon web services (AWS) security groups) can be updated to drop packets from the IP of the entity that have a destination outside the cloud. Embodiments are operable to configure enforcement points at the edge of a network where an entity is communicatively coupled thereto thereby controlling access of the entity on a customized basis (e.g., customized or tailored for the entity).

In some embodiments, if the categorization or characteristics functionality is being updated (e.g., which could result in a change in one or more access rules that are assigned to an enforcement point closest an entity and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, web interface, SNMP, etc.), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or 3$^{rd}$ party systems (e.g., system 150) may further be used for determining one or more tags or characteristics for an entity. For example, a vulnerability assessment (VA) system may be queried to verify or check if an entity is in compliance and provide that information to network monitor device 102. External or 3$^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122a-b and provide network access to network coupled devices 122a-b. Aggregation device 106 may further be configured to provide information (e.g., operating system, entity software information, entity software versions, entity names, application present, running, or both, vulnerabilities, patch level, etc.) to network monitor device 102 about the network coupled devices 122*a-b*. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122*a-b* via a wireless connection. Aggregation device 106 may be configured to communicate with network coupled devices 122*a-b* using a standard protocol with proprietary extensions or modifications.

Aggregation device 106 may further provide log information of activity and properties of network coupled devices 122*a-b* to network monitor device 102. It is appreciated that log information may be particularly reliable for stable network environments (e.g., where the types of devices on the network do not change often). The log information may include information of updates of software of network coupled devices 122*a-b*.

Figure 2:
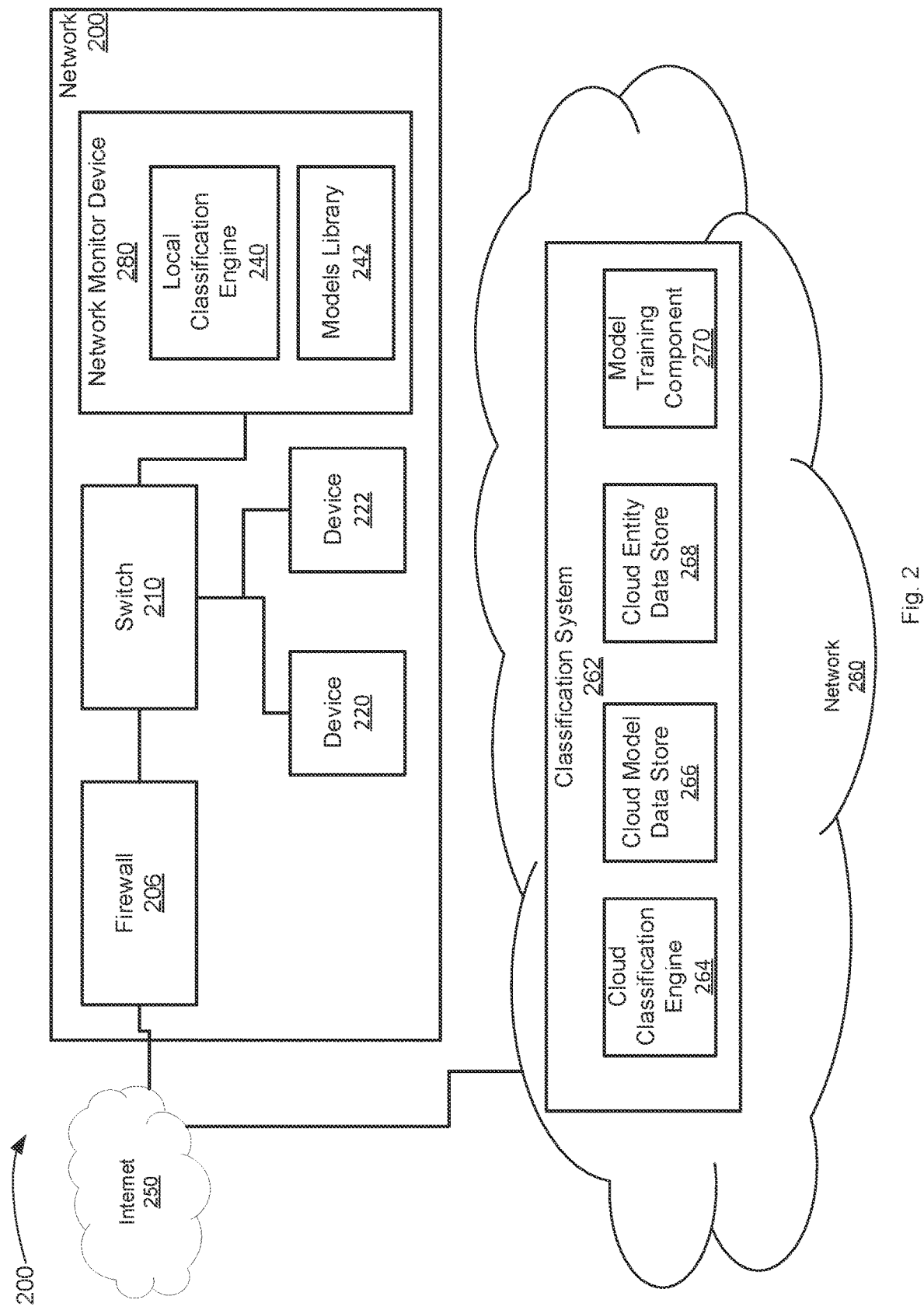
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewall 206 and switch 210) and a network monitor device 280 (e.g., network monitor device 102) which can perform or determine one or more classifications, as described herein, associated with the various entities communicatively coupled in example network 200. Network monitor device 280 may further perform training of one or more models for use in classification, as described herein.

Classification system 262 may be a cloud classification system operable to perform classification of an entity at multiple granularities, as described herein. In some embodiments, classification system 262 may be part of a larger system operable to perform a variety of functions, e.g., part of a cloud based network monitor entity, security entity, etc. Classification system 262 may further be operable to train one or more models at various granularities, as described herein. Example components are shown of network monitor device 280 and classification system 262 and other components may be present or included.

FIG. 2 shows example devices 220-222 (e.g., devices 106, 122*a-b*, 120, and 130, other physical or virtual devices, other entities, etc.) and it is appreciated that more or fewer network devices or other entities may be used in place of the devices of FIG. 2. Example devices 220-222 may be any of a variety of devices or entities (e.g., OT devices, IoT devices, IT devices, etc.), as described herein. Enforcement points including firewall 206 and switch 210 may be any entity (e.g., network device 104, cloud infrastructure, etc.) that is operable to allow traffic to pass, drop packets, restrict traffic, etc. Network monitor device 280 may be any of a variety of network devices or entities, e.g., router, firewall, an access point, network access control (NAC) device, intrusion prevention system (IPS), intrusion detection system (IDS), deception device, cloud-based device or entity, virtual machine based system, etc. Network monitor device 280 may be substantially similar to network monitor device 102. Embodiments support IPv4, IPv6, and other addressing schemes. In some embodiments, network monitor device 280 may be communicatively coupled with firewall 206 and switch 210 through additional individual connections (e.g., to receive or monitor network traffic through firewall 206 and switch 210).

Switch 210 communicatively couples the various devices of network 200 including firewall 206, network monitor device 280, and devices 220-222. Firewall 206 may perform network address translation (NAT). Firewall 206 communicatively couples network 200 to Internet 250 and firewall 206 may restrict or allow access to Internet 250 based on particular rules or ACLs configured on firewall 206. Firewall 206 and switch 210 are enforcement points, as described herein.

Network monitor device 280 can access network traffic from network 200 (e.g., via port mirroring or SPAN ports of firewall 206 and switch 210 or other methods). Network monitor device 280 can perform passive scanning of network traffic by observing and accessing portions of packets from the network traffic of network 200. Network monitor device 280 may perform an active scan of an entity of network 200 by sending one or more requests to the entity of network 200. The information from passive and active scans of entities of network 200 can be used to determine one or more properties associated with the entities of network 200.

Network monitor device 280 includes local classification engine 240 which may perform classification of the entities of network 200 including firewall 206, switch 210, and devices 220-222. Network monitor device 280 further includes models library 242 which includes models of various granularities and thresholds (e.g., confidence thresholds) associated with the models. The models of models library 242 may have been trained locally (e.g., by network monitor device 280), in the cloud (e.g., by classification system 262), or a combination thereof. In some embodiments, the thresholds may be customized based on user input, configured in association with training, or a combination thereof, as described herein. Local classification engine 240 may perform classification (e.g., blocks of flowchart 400) of the entities of network 200 using one or more models of models library 242. In some embodiments, the use of various models at various granularities may enhance classification that is otherwise limited by active scans not being available in an environment (e.g., an environment with entities that are sensitive to or not able to handle active scanning).

Local classification engine 240 can send data (e.g., property values) about entities of network 200, as determined by local classification engine 240, to classification system 262. Local classification engine 240 may encode and encrypt the data prior to sending the data to classification system 262. In some embodiments, local classification engine 240 checks the confidence and granularity of each classification result and communicates with classification system 262 data to perform a classification where at least one of a granularity threshold or a confidence threshold are not met. Local classification engine 240 may receive a classification result from classification system 262 which network monitor device 280 can use to perform various security related measures. In some embodiments, classification of an entity may be performed in part by local network monitor device 280 (e.g., local classification engine 240) and in part by classification system 262.

Classification system 262 can perform a cloud based classification, as described herein. In some embodiments, classification system 262 includes cloud classification engine 264, cloud model data store 266, cloud entity data store 268, and model training component 270.

Cloud classification engine 264 may perform classification (e.g., blocks of flowchart 400) based on data received from network monitor device 280 (e.g., properties), as described herein. Cloud classification engine 264 may unencrypt and decode the information received prior to performing a classification. Cloud classification engine 264 may use cloud model data store 266 in determining a classification based on one or more models associated with various granularities. A classification determined by cloud classification engine 264 can be sent back to network monitor device 280.

Cloud model data store 266 is model data store (e.g., a cloud model database) with each model associated with a granularity, as described herein. Cloud profile data store 266 is not subject to the resource conditions or limitations (e.g., processing power, storage, etc.) that may impact network monitor device 280 (e.g., and local classification engine 240). Cloud entity data store 268 is a data store (e.g., a cloud entity database) of entity information that has been uploaded to classification system 262. For example, the data in cloud entity data store 268 may include entity or device name, operating system, function, vendor/model, and host information from a variety of networks (e.g., that have network monitor entities configured to upload entity information).

Model training component 270 is configured to train one or more models at various granularities (e.g., blocks of flowchart 500), as described herein. The data of cloud entity data store 268 may be used by model training component 270 to train one or more models at various granularity levels, as described herein. Cloud entity data store 268 may be used to train one or more of the models of cloud model data store 266. Model training component 270 may further evaluate models and determine respective confidence thresholds associated with each model, as described herein.

Both local classification engine 240 and cloud classification engine 264 may use profile based classification along with other classification methods in conjunction with classifications based on various models associated with various granularities.

Figure 3:
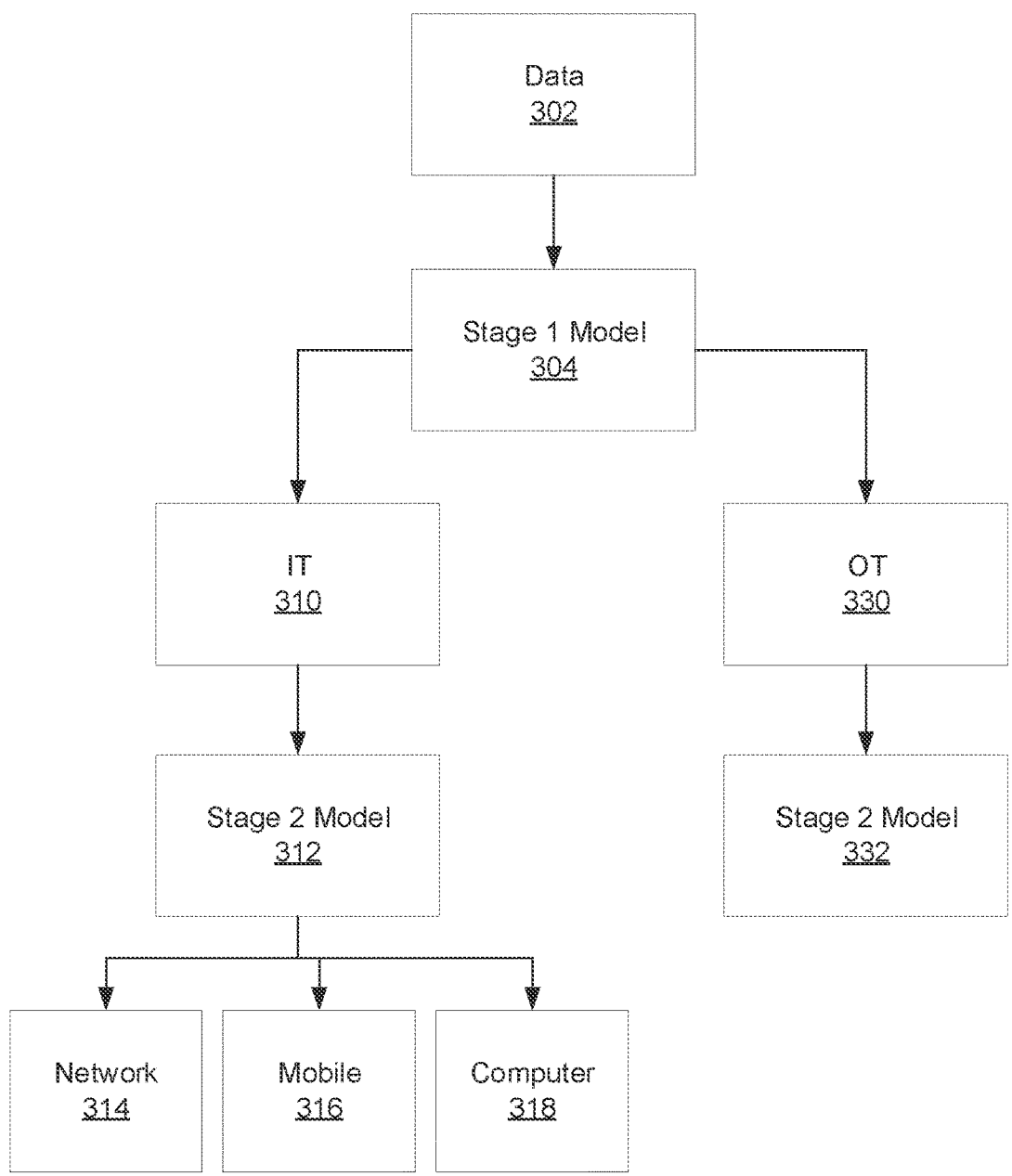
FIG. 3 depicts a diagram of aspects of classification using multiple models in accordance with one implementation of the present disclosure.

FIG. 3 depicts a diagram of aspects of classification using multiple models in accordance with one implementation of the present disclosure. FIG. 3 depicts an example tree 300 with various models at various stages or layers (e.g., of granularity). The different layers of models at each layer allows increased granularity and higher confidence classifications because the models are trained to perform classification at a particular granularity.

Example tree 300 depicts an example classification tree for function in accordance with some embodiments. The tree 300 include data 302, stage 1 model 304, IT classification 310, OT classification 330, stage 2 model 312 and stage 2 model 332, network classification 314, mobile classification 316, and computer classification 318. The various models of tree 300 (e.g., models 304, 312, and 332) may be trained according to embodiments (e.g., blocks of flowchart 500). The classifications (e.g., 310, 314, 316, 318, and 330) can be determined or inferred according to embodiments (e.g., blocks of flowchart 400). Various portions of tree 300 may be performed by different components (e.g., components of system 600) of an entity (e.g., network monitor device 102 or network monitor device 280).

Data 302 may be one or more properties associated with a selected entity (e.g., selected based on being communicatively coupled to the network, selected as part of a scan or classification, for instance, periodically or upon an update of a model or classification information). Data 302 may be selected or refined, as described herein, by a network monitor device (e.g., network monitor device 102 or 280).

Model 304 may be a model that is trained to determine whether an entity is an IT entity or an OT entity based on one or more properties associated with the entity. The model 304 may take the data 302 as input and output IT classification 310 (e.g., a classification result) associated with the entity being classified as an IT entity or OT classification 330 (e.g., a classification result) associated with the entity being classified as an OT entity. As described herein, the data 302 (e.g., properties) may be featurized before input to the model 304.

Model 304 may further have an associated threshold that is compared against a confidence associated with IT classification 310 or OT classification 330. If the confidence associated with the IT classification 310 or OT classification 330 is below the threshold associated with model 304, the entity may be determined to be unclassified, e.g., having a classification result of unknown. If the confidence associated with the IT classification 310 or OT classification 330 is above the confidence associated with model 304, then model 312 or model 332 may be used.

For example, model 304 may classify an entity as an IT entity with 90% confidence and 10% confidence that the entity is an OT entity. If the threshold associated with model 304 is 70% then embodiments will use model 312 to predict, infer, or determine a classification of the entity as a network entity, mobile entity, computer entity, etc. Embodiments thus support using thresholds to determine whether to continue using finer grain models to further classify an entity at finer granularity.

With improved classification with stage 1 model 304, the information that an entity is an IT entity or an OT entity can be useful for applying policies or other security actions. For example, OT posture checks or checks for default passwords can be done as well as checks of what other entities an OT entity is communicating with. As another example, based on an entity being an IT entity, the operating system version can be checked to see if the entity has an approved OS version (e.g., Windows™ 10) or unapproved OS version (e.g., Windows™ XP, Windows™ 7, etc.). In some embodiments, the checks performed on an entity classified as an IT entity are different from an entity classified as an OT entity.

Stage 2 model 312 and 332 are finer grain or increased granularity models as compared to stage 1 model 304. Stage 2 model 312 may be trained to determine or classify an entity as a particular type of IT entity based on data 302. The classifications output or determined by stage 2 models 312 and 332 may have associated confidences which are compared against respective thresholds associated with each of stage 2 models 312 and 332.

In some embodiments, data 302 is refined use with stage 2 model 312 to select relevant data and remove less relevant data for input to stage 2 model 312. For example, stage 2 model 312 may be trained to classify an IT entity as a network entity (e.g., switch, router, firewall, VPN entity, wireless access point, etc.), a mobile entity (e.g., smartphone, laptop, etc.), a computer entity (e.g., a server, a desktop, healthcare workstation, etc.), a printer, a phone entity (e.g., VOIP entity), an accessory (e.g., scanner), etc. Stage 2 model 312 may thus classify an entity with network classification 314, mobile classification 316, and computer classification 318 or other classification (not shown). Stage 2 model 312 may take the data 302 (e.g., selected IT associated data and not OT associated data) as input and output network classification 314, mobile classification 316, and computer classification 318 associated with the entity being classified as a network entity, a mobile entity, or a computer entity. In some embodiments, the IT entity may further be classified as being an entity within the banking (e.g., teller computer, loan department computer, etc.), retail (e.g., point of sale computer, inventory workstation, etc.), or education space (e.g., classroom computer). If a confidence associated with a classification determined via stage 2 model 312 is above the confidence associated with stage 2 model 312, then further models (not shown) may be used to further classify the entity (e.g., based on firmware, hardware version, etc.).

Stage 2 model 332 may be trained to classify an OT entity (based on OT classification 330 by stage 1 model 304) as a particular type of OT entity. For example, stage 2 model 332 may classify an OT entity as a financial entity, industrial entity, healthcare entity, manufacturing entity, etc. If the confidence associated with the classification of the entity as a financial entity, industrial entity, healthcare entity, manufacturing entity is below the confidence associated with model 312, the entity may be determined to be classified as an OT entity (e.g., just at stage 1 granularity). If the confidence associated with the classification of the entity as a financial entity, industrial entity, healthcare entity, manufacturing entity is above the confidence associated with model 304, then further models (not shown) may be used to further classify the entity (e.g., based on firmware, hardware version, etc.).

In some embodiments, the number of models may be the number of nodes in a classification tree minus the number of leaves. For example, with tree 300 of FIG. 3, the total number of nodes is three and the number of leaves is three, with the number of models being three.

While FIG. 3 is described with respect to function, embodiments support a trees of models for other classifications including operating system. For example, for operating systems, the first model may classify the entity with respect to the type of operating system (e.g., Windows™, Linux, MacOS™, etc.). A second layer of models (e.g., similar to stage 2 models 312 and 330) may classify a version of the operating system (e.g., Windows™ XP, Windows™ 10, MacOS™ X, etc.). A third layer of models may classify a service pack or patch level associated with the operating system. The OS version, service pack or patch level, or a combination thereof may be used to perform security actions or compliance procedures (e.g., requiring certain patch levels or OS versions).

Embodiments may further support combining the classifications from the multiple models for function and OS. For example, the OS and function of an entity may be used to predict or infer the vendor of an entity.

In solving the hierarchical challenges, embodiments can mitigate issues associated with imbalanced labels. Through the use of more specialized stage wise modeling approach embodiments are able to reduce the skew of labels because each stage is focusing on a specific level in the classification hierarchy. For example, using a specific model to classification at a granularity of IT or OT, the output of that allows use of specialized models to handle separate branches of the hierarchy, such as healthcare, facilities, or manufacturing for OT devices.

If 80% of the data available for training models is IT and the remaining 20% is OT, then the 20% of data that is OT data can be used for training a specialized or finer granularity model to classify OT entities (e.g., stage 2 model 332). This finer granularity OT model will be more accurate as compared to a model trained on both IT and OT data, because the OT model was not trained with data that has a skewed distribution weighing in favor of IT data. Embodiments can thus use specialized models for each branch in the hierarchy. For example, an OT model trained with OT data can be used for the OT branch of tree 300. This overcomes the problem of the model being biased towards the majority class of data.

In some embodiments, each model for each stage can be tuned based on hyper parameters (e.g., inputs, weights, etc.) specific for each model. Each model can thus be trained on different data, different features, different tuning, or a combination thereof.

The use of models at different levels of granularity further allows flexibility in the classification granularity. The granularity can be controlled by a user through configuration of one or more thresholds (e.g., confidence thresholds) associated with one or more models. This allows controlling of the accuracy of each decision at each level so that a threshold is applied at each level of the hierarchy. This control enables avoiding use of resources (e.g., processing and memory) to attempt to classify an entity that cannot be classified at a higher level of the hierarchy. For example, if an entity cannot be classified with a confidence above a threshold using stage 1 model 304, then stage 2 models 312 and 332 may not be used to attempt to classify the entity. In addition, use of resources (e.g., processing and memory) for determining a classification using stage 2 models 312 and 332 would be avoided due to the models not being used. For example, if an entity is classified as an OT entity, then stage 2 model 312 may be not used to determine a particular IT entity type of the entity because the entity was determined to be an OT entity.

Figure 4:
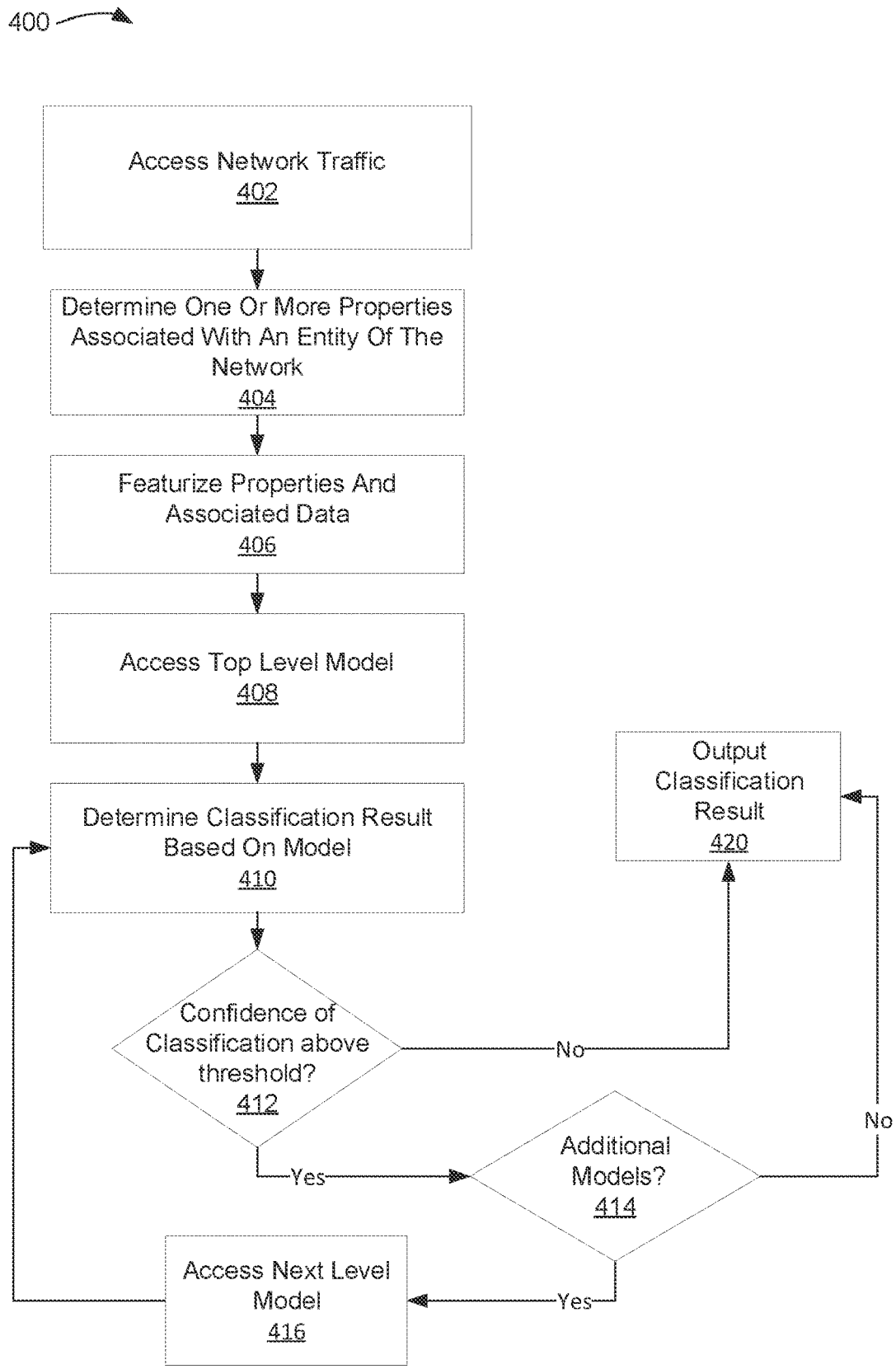
FIG. 4 depicts a flow diagram of aspects of a method for performing classification in accordance with one implementation of the present disclosure.
Figure 5:
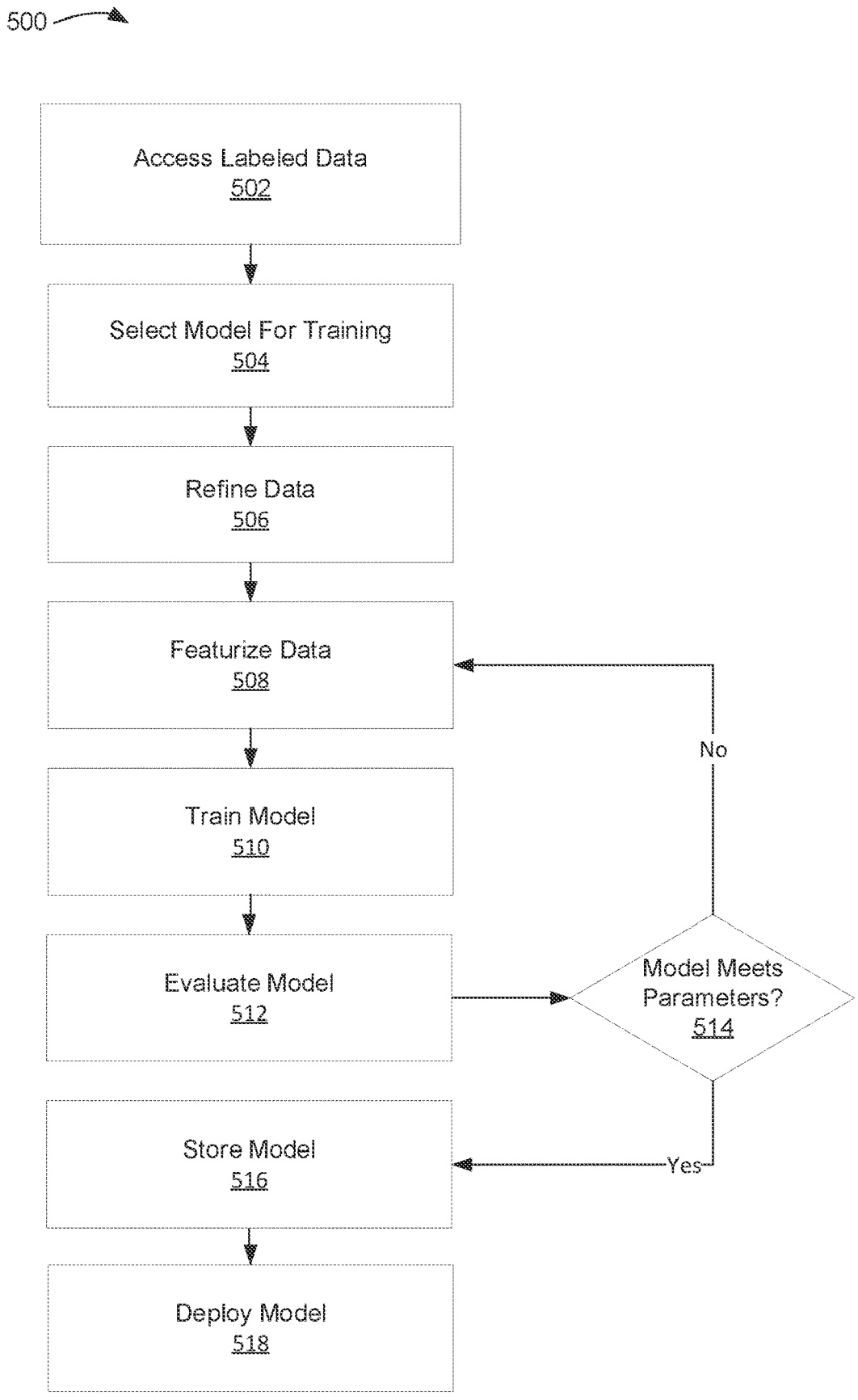
FIG. 5 depicts a flow diagram of aspects of a method for training multiple models for classification in accordance with one implementation of the present disclosure.

With reference to FIGS. 4-5, flowcharts 400-500 illustrate example operations used by various embodiments. Although specific operation blocks ("blocks") are disclosed in flowcharts 400-500, such blocks are examples. That is, embodiments are well suited to performing various other blocks or variations of the blocks recited in flowcharts 400-500. It is appreciated that the blocks in flowcharts 400-500 may be performed in an order different than presented, and that not all of the blocks in flowcharts 400-500 may be performed. The blocks of flowcharts 400-500 may be performed locally by an entity, in a cloud, or a combination thereof. One or more models may be trained in the cloud, locally, or a combination thereof by the blocks of flowchart 500. One or models (e.g., the models trained by blocks of flowchart 500) may be used to determine one or more entity classifications locally, in the cloud, or a combination thereof, by the blocks of flowchart 400.

FIG. 4 depicts a flow diagram of aspects of a method for performing classification in accordance with one implementation of the present disclosure. Various portions of flowchart 400 may be performed by different components (e.g., components of system 600) of an entity (e.g., network monitor device 102 or network monitor device 280). Flowchart 400 depicts a process for classifying an entity at one or more levels of granularity using one or more models.

At block 402, network traffic is accessed. The traffic may be accessed by a network monitoring entity (e.g., network monitoring devices 102 or 280) via a port mirroring or SPAN port or via another method, as described herein. The traffic data may include one or more properties and property values for each entity communicatively coupled to one or more networks. The one or more properties and property values may be extracted from the traffic data. The traffic may include active scanning properties (e.g., if active scanning is enabled).

In some embodiments, data (e.g., including properties and property values) is further accessed from third party systems (e.g., system 150, an external system, etc.) and used along with traffic data. The data from third party systems may be accessed from the third party systems via a plugin or module of a network monitoring entity. For example, this data could be accessed from a variety of systems including, but not limited to, a vulnerability assessment (VA) system, a threat detection (TD) system, endpoint management system, a mobile device management (MDM) system, a firewall (FW) system, a switch system, an access point system, a WMI script, network infrastructure, an entity itself, etc.

In some embodiments, the network traffic is accessed based on an entity being selected or being communicatively coupled to a network. The entity may be selected as part of a periodic scan of the network (e.g., a scan of network 100 by network monitoring device 102). The entity may further be selected as part of a continuous, real-time, or combination thereof scan of the network. The entity may be an endpoint, a user, etc., as described herein. An entity being communicatively coupled to the network may be detected (e.g., being communicatively coupled to network device 104 or other enforcement point). The detecting of the entity coupled to the network may include detecting the entity in response to the entity being recoupled or readmitted to the network. This may further include detecting that a user has logged into a machine or the active user account on a device has changed.

At block 404, one or more properties associated with each entity of the network are determined. The properties can include data or values extracted from network traffic (e.g., packets) associated with each entity. For example, one or more properties and property values may be extracted or accessed based on one or more keywords or variables associated with portions of a packet, protocol fields, information from Nmap, information from p0f, data from active scans (e.g., probing or sending requests to an entity), etc. Each property may be stored as a property key (e.g., property name) and value (e.g., data of the property) pair. The properties may include network interface card (NIC) vendor (e.g., portion of a MAC address), dynamic host control protocol (DHCP) vendor class, HTTP user agent string, operating system (OS) data, network function, transmission control protocol/internet protocol (TCP/IP) SynAck fingerprint, virtual machine guest OS, Nmap-Banner, Windows™ version, DHCP hostname, Macintosh Manageable, DHCP device class, Linux Manageable, open ports, DHCP options list, DHCP request list, DHCP device OS, MAC Address, Macintosh OS Version, DNS Name, Linux OS version, Switch Port power over Ethernet (PoE) connected device, system description, classified by action or operator classified, device is a NAT device, Windows services installed, and switch port name. The properties associated with an entity may be represented as key (e.g., property or property name) value sets where each property is associated with one or more associated values (e.g., a value from a portion of a packet). The properties can thus be accessed from one or more packets being transmitted over the network agentlessly or without involvement of an agent (e.g., software for collecting the properties running on the entity sending the packets).

The properties may further include identification information (e.g., serial number, etc.), device categorization, user categorization, location, compliance, risk, or a combination thereof which may be based on fingerprints, signatures, entity behavior, etc., as described herein. Embodiments are able to determine the one or more properties, or other aspects of an entity agentlessly (e.g., based on observing network traffic without needing software running on the entity to access the properties) thereby allowing properties or other aspects of an entity to be quickly determined for entities that do not have or support an agent as well as without needing an agent to be installed for entities that do support an agent. In some embodiments, the one or more properties or other aspects are determined in real-time (e.g., instantaneously or substantially instantaneously). For example, a compliance characteristic may be determined based on an antivirus scan that is specified in a network access policy.

Properties may be collected or accessed from various of sources including, from the entity, from the network environment, network devices or enforcement points (e.g., one or more switches, routers, firewalls, etc.) and any other entity or resource communicatively coupled to the network (e.g., network 100) including other systems (e.g., system 150). The properties may be determined by an entity (e.g., network monitor device 102 or network monitor device 280) that is configured to perform one or more blocks of flowchart 400.

At block 406, the properties and associated data (e.g., property values) are featurized. Featurization is the process of encoding information into numerical form for use with one or more models. For example, the featurization may include converting one or more values associated with a property (of an entity) into a numerical form, e.g., a vector or a matrix, that can be processed by a machine learning trained model. The information in numerical form can then be used by a machine learning trained model to infer or determine a classification. A feature may be a set of distinguishing characteristics for each class of an entity. For example, a feature may be a set of particular properties associated with a particular class of entities. In some embodiments, the featurization may be based on keyword counts, a hash table, etc.

At block 408, a top level model is accessed. The top level model accessed may be most broad model or high level model. In some embodiments, the top level model will be a least fine grain model. For example, top level model for function may be an IT/OT model that can be used to infer or determine whether an entity is an IT entity or OT entity. For a top level for operating system may be used to determine whether an entity has a Windows™, Linux™, MacOS™ Android™, or other operating system.

At block 410, a classification result is determined based on the model. The classification result may be an inference determined based on the model and the information associated with an entity. The classification result may be a list of numbers (e.g., associated with a profile) representing one or more confidence values. This list of numbers may be list of probabilities (e.g., associated with classifications). For example, for a model trained to classify an entity as an IT entity or an OT entity, the output may be [0.9, 0.1] representing a 90% chance the entity is an IT entity. The output may be [0.1, 0.9] representing a 90% change the entity is an OT device. The confidence value is associated with the computed accuracy or probability of the classification result.

In some embodiments, the classification result may be determined based on multiple models and other methods (e.g., profile based classification, fingerprints based classification, etc.). For example, the classification result may be based on a model trained, as described herein, a cloud based model, a model trained based on external data (e.g., data from the Internet), or a combination thereof. Each model may be trained as described with respect to FIG. 5. The classification results of may be combined or ensembled based on a variety of methods including an average, voting, etc. Embodiments may support standard ensemble methodologies.

In some embodiments, multiple confidence values for a particular classification result from multiple models may be averaged to determine a combined confidence. For example, if a cloud model classification result has a 75% confidence and an Internet data based classification result has a 90% confidence, the combined result will be 82.5%.

At block 412, whether confidence of the classification is above the threshold is determined. The determination may be made by comparing the confidence of the classification against a threshold. The threshold may be associated with the model thereby allowing embodiments to customize or tailor thresholds as various granularities of classification. Each threshold associated with a model may be preconfigured (e.g., as part of the training process, for instance as part of blocks 510-512), be user configurable (e.g., via a slider bar in a GUI), or combination thereof. In some embodiments, the threshold may be a recommended value and a user may further tune or configure the threshold. If the confidence of the classification is above the threshold, block 414 may be performed. If the confidence of the classification is not above the threshold, block 420 may be performed.

At block 414, whether there are additional models is determined. The additional models may be models associated with different granularities (e.g., in the tree of the classification result). For example, if the classification result was that the entity is an IT entity, the additional models could be for the type of IT entity, for instance, network device, mobile device, computer, etc. If there are additional models, block 416 may be performed. If there are no additional models (e.g., when the most fine grained classification has been determined or a threshold has not been met or exceeded), block 420 may be performed.

At block 416, a next level model is accessed. The next level model is a finer grain model. The next level model accessed may be accessed based on the classification result. For example, if the classification result is that the entity is an OT device, then the next level model may determine if the entity is a healthcare entity, industrial entity, etc., or other finer grain classification. Block 410 may be performed and a classification result determined for the entity using the next level model.

At block 420, the classification result is output. The classification result may be stored. The classification result may further be used to apply one or more policies, rules, or other security procedures or actions to the entity. In some embodiments, the confidence associated with the classification result may be output and stored, etc.

Block 402 may then be performed as part of a continuous, real-time, or combination thereof monitoring of the network to dynamically classify entities. Block 402 may also be performed each time an entity is communicatively coupled to the network (e.g., new devices and returning devices) so a classification for that entity can be determined.

FIG. 5 depicts a flow diagram of aspects of a method for training multiple models for classification in accordance with one implementation of the present disclosure. Various portions of flowchart 500 may be performed by different components (e.g., components of system 600) of an entity (e.g., network monitor device 102 or network monitor device 280). Flowchart 500 depicts a process for training a plurality of models with data selected based on a granularity associated with each model. Blocks of flowchart 500 may be performed by a network monitoring entity (e.g., network monitor devices 102 or 280) or classification systems 262.

In some embodiments, the blocks of flowchart 500 may be used to train multiple sets of models on different sets of data. For example, models for function at IT/OT granularity, IT entity function granularity (e.g., switch, mobile, server, etc.), and OT entity function granularity (e.g., healthcare, industrial, financial, etc.) may be trained on cloud data and Internet data resulting in a total of six models for function classification being available for classification (e.g., by blocks of flowchart 400) at various granularity levels. As another example, models for operating system (OS) may be trained on cloud data and Internet data resulting in the two additional models for OS classification.

At block 502, labeled data is accessed. The labeled data may include an entity or device classification label, one or more associated properties, or a combination thereof. In some embodiments, the labeled data is accessed from a cloud resource that includes entity data with labels (e.g., cloud entity data store 268). The data in cloud resource may have been uploaded by a network monitor entity (e.g., network monitor device 102 or 280) and may have been labeled based on classification (e.g., profiled based classification, fingerprint based classification, etc.), human input, or a combination thereof. The labeled data may include one or more properties associated with each label. The labels may include IT, server, switch, router, Windows™ operating system, Linux™ operating system, MacOS™ operating system, mobile entity, SCADA entity, programmable logic controller (PLC) entity, access point, printer, scanner, X-ray machines, IP cameras, etc. The labels may be any function, OS, entity type, etc., or other node in a classification tree (e.g., tree 300).

At block 504, a model is selected for training. The model may be selected based on granularity. The blocks of flowchart 500 may be performed on models with increasing granularity. For example, a first model may be trained to determine function between IT and OT entities. A second model may be trained to determine whether an entity classified as an OT entity by the first model is a healthcare entity, financial entity, an industrial entity, a manufacturing entity, etc.

At block 506, the data is refined. The refinement may include removing noise, cleaning the data, refining the data, and selecting data. The data may be refined to remove data that is not relevant for classification or other model training. The refinement may including removing empty records, records with corrupted data, records with encrypted data. The refinement may include selecting records with confidence above a threshold (e.g., reliable data, for instance, data from networks with reliable network configurations).

In some embodiments, the refinement may be based on the granularity of the model being trained. For example, for an OT model that will be trained to distinguish or classify healthcare, financial, and industrial entity or device, the refinement will remove labeled data associated with IT entities.

At block 508, the data is featurized. The featurization encodes the data, including labels, into numerical form for use in training the one or more models each with an associated granularity. The featurization may be substantially similar to featurization as described with respect to FIG. 4. Each model may be associated with a particular portion of a classification tree (e.g., an IT or OT portion of tree 300). In some embodiments, the output of the featurization will be a vector of numbers, e.g., a matrix of numbers, which can then be used to train the model. The featurized data may be output encoded using standard machine learning methodologies.

At block 510, the model is trained. The featurized data is used to train the model. The model may be trained using standard training methods (e.g., XGBoost). Embodiments may use training methods including training the models on unknowns sets of entities, e.g., the properties associated with unknown sets, as described herein. The training may further be based on training each model for an associated granularity (e.g., to determine or classify an OT entity type) with associated or selected data (e.g., properties associated with OT entity type).

At block 512, the model is evaluated. The model may be evaluated based on accuracy and coverage for classifications based on live or production environment data (e.g., not included in the training data). Coverage refers to the model being able to classify entities over a variety of types of entities or classifications for which the model has been trained.

The training of a model using the more available or more common properties from the unknown set(s), as described herein, enables reduced bias of the model and better results for classifying unknowns. The evaluation performed as part of block 512 may evaluate the trained model based on one or more unknown entities. The unknown entities may be entities that were labeled as unknown during training of a model but the actual label of the unknown entity is used to evaluate the classification result determined using the model. The unknown entities may thus be used to evaluate the model and calibrate the model further using the blocks of flowchart 500.

At block 514, whether the model meets parameters is determined. The parameters may be selected by a user (e.g., a researcher or a user) and be standards (e.g., accuracy and coverage) for a model to be deployed (e.g., used in production environments). If the trained model meets parameters, block 516 may be performed. If the trained model does not meet parameters, block 506 or 508 may be performed. For example, if the model is 80% accurate but 90% accuracy is the evaluation parameter, the block 508 may be performed with further tuning of featurization, other machine learning model parameters (e.g., hyperparameters), or combination thereof. The featurization and model parameters may be tuned independently and different data, different features, different parameters, or a combination thereof may be to train the model (e.g., block 510).

At block 516, the model is stored. The model may be stored for later usage (e.g., by blocks of flowchart 400) and deployment (e.g., block 518). The model may be stored locally by an entity performing the blocks of flowchart 500, may be stored in a cloud resource (e.g., cloud based storage, for instance, cloud model data store 266), or combination thereof.

At block 518, the model is deployed. The model may be deployed to a cloud resource, one or more other entities (e.g., a network monitor entity, for instance, network monitor device 102, network monitor device 280), or a combination thereof.

Block 502 may then be performed to train another model (e.g., of a tree, for instance, tree 300). The next model trained may be of a different, e.g., higher, granularity.

Figure 6:
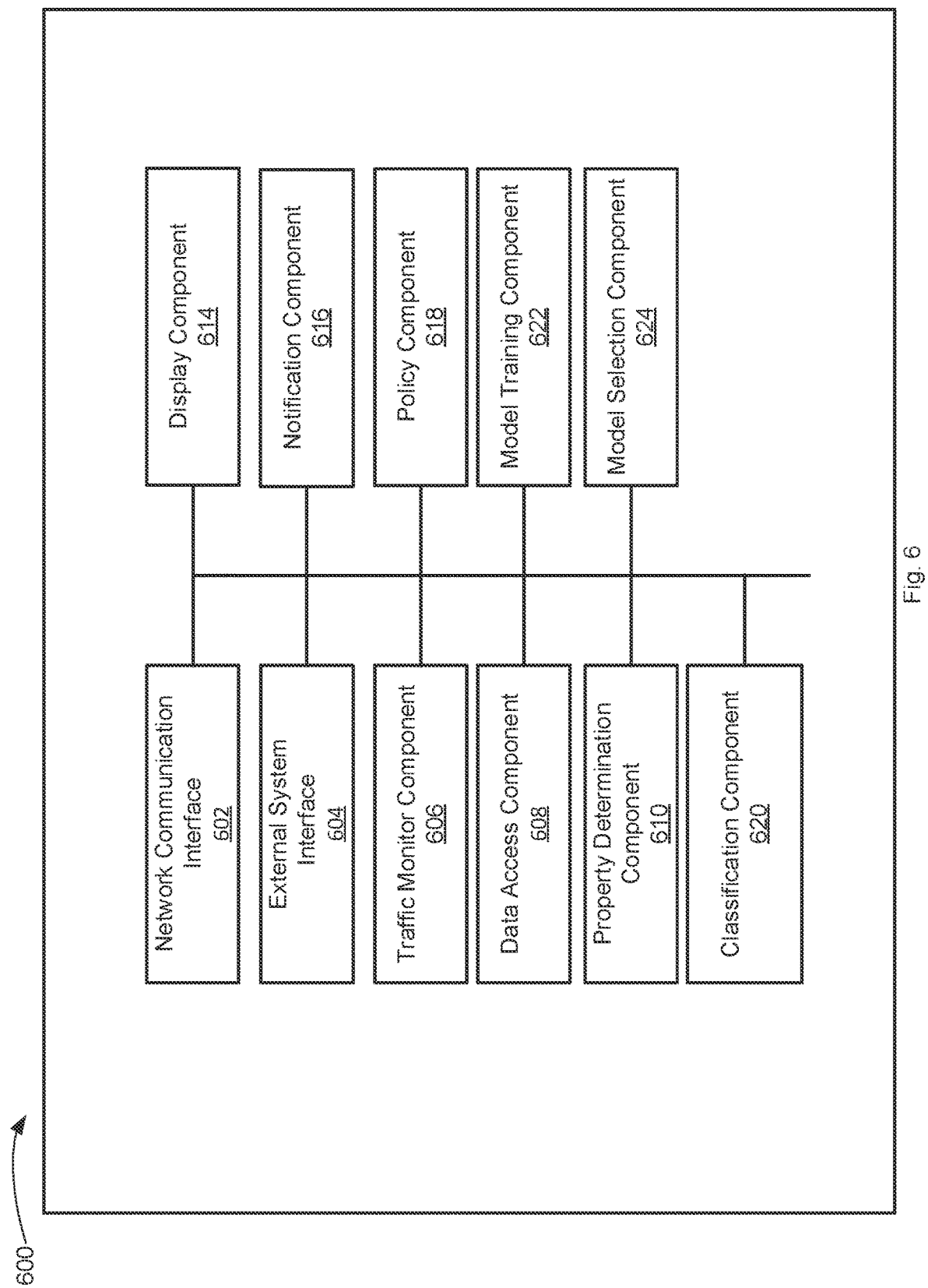
FIG. 6 depicts illustrative components of a system for classifying entities, training models, or a combination thereof in accordance with one implementation of the present disclosure.

FIG. 6 illustrates example components used by various embodiments. Although specific components are disclosed in system 600, it should be appreciated that such components are examples. That is, embodiments are well suited to having various other components or variations of the components recited in system 600. It is appreciated that the components in system 600 may operate with other components than those presented, and that not all of the components of system 600 may be required to achieve the goals of system 600.

FIG. 6 depicts illustrative components of a system for classifying entities, training models, or a combination thereof in accordance with one implementation of the present disclosure. Example system 600 or classifier 600 includes a network communication interface 602, an external system interface 604, a traffic monitor component 606, a data access component 608, a property determination component 610, a display component 614, a notification component 616, a policy component 618, a classification component 620, a model training component 622, and a model selection component 624. The components of system 600 may be part of a computing system or other electronic device (e.g., network monitor device 102 or network monitor device 280) or a virtual machine or device and be operable to monitor and one or more entities communicatively coupled to a network, monitor network traffic, determine one or more classifications of an entity, perform one or more actions, as described herein. For example, the system 600 may further include a memory and a processing device, operatively coupled to the memory, which may perform the operations of or execute the components of system 600. The components of system 600 may access various data and characteristics or properties associated with an entity (e.g., network communication information) and data associated with one or more entities. It is appreciated that the modular nature of system 600 may allow the components to be independent and allow flexibility to enable or disable individual components or to extend, upgrade, or combination thereof components without affecting other components thereby providing scalability and extensibility. System 600 may perform one or more blocks of flow diagrams 400-500. In some embodiments the components of 600 may be part of network monitor entity (e.g., network monitor devices 102 and 280), in the cloud, or the various components may be distributed between local and cloud resources.

Communication interface 602 is operable to communicate with one or more entities (e.g., network device 104, firewall 206, switch 210, other devices coupled thereto, devices 220-222, etc.) coupled to a network that are coupled to system 600 and receive or access information about entities (e.g., device information, device communications, device characteristics, properties, etc.), access information as part of a passive scan, send one or more requests as part of an active scan, receive active scan results or responses (e.g., responses to requests), as described herein. The communication interface 602 may be operable to work with one or more components to initiate access to characteristics or determination of characteristics of an entity to allow determination of one or more properties which may then be used for device compliance, asset management, standards compliance, classification, identification, etc., as described herein. Communication interface 602 may be used to receive and store network traffic for determining properties, as described herein.

External system interface 604 is operable to communicate with one or more third party, remote, or external systems to access information including characteristics or properties about an entity (e.g., to be used to determine a security aspects). External system interface 604 may further store the accessed information in a data store. For example, external system interface 604 may access information from a vulnerability assessment (VA) system to enable determination of one or more compliance or risk characteristics associated with the entity. External system interface 604 may be operable to communicate with a vulnerability assessment (VA) system, an advanced threat detection (ATD) system, a mobile device management (MDM) system, a firewall (FW) system, a switch system, an access point (AP) system, etc. External system interface 604 may query a third party system using an API or CLI. For example, external system interface 604 may query a firewall or a switch for information (e.g., network session information) about an entity or for a list of entities that are communicatively coupled to the firewall or switch and communications associated therewith. In some embodiments, external system interface 604 may query a switch, a firewall, or other system for information of communications associated with an entity.

Traffic monitor component 606 is operable to monitor network traffic to determine if a new entity has joined the network or an entity has rejoined the network and monitor traffic for analysis by data access component 608, classification component 620, and model training component 622, as described herein. Traffic monitor component 606 may have a packet engine operable to access packets of network traffic (e.g., passively) and analyze the network traffic. The traffic monitor component 606 may further be able to access and analyze traffic logs from one or more entities (e.g., network device 104, system 150, or aggregation device 106) or from an entity being monitored. The traffic monitor component 606 may further be able to access traffic analysis data associated with an entity being monitored, e.g., where the traffic analysis is performed by a third party system.

Data access component 608 may be operable for accessing data including metadata associated with one or more network monitoring entities (e.g., network monitor devices 102 or 280-282), including properties that the network monitoring entity is monitoring or collecting, software versions (e.g., of the profile library of the network monitoring entity), and the internal configuration of the network monitoring entity. The data accessed by data access component 608 may be used by embodiments to perform classification including ensuring that the most up to date models, profiles, and other classification information is being used (e.g., by classification component 620). Data access component 608 may further access vertical or environment data and other user associated data, including vertical, environment, common type of devices for the network or network portions, segments, areas with classification issues, etc., which may be used for classification.

Data access component 608 may access data associated with active or passive traffic analysis or scans or a combination thereof. Data access component may further be able to access and analyze traffic logs from one or more entities (e.g., network device 104, system 150, or aggregation device 106) or from an entity being monitored. Data access component 608 may further be able to access traffic analysis data associated with an entity being monitored, e.g., where the traffic analysis is performed by a third party system. Information accessed by data access component 608 may be stored, displayed, and used as a basis for classification (e.g., blocks of flowchart 400), model training (e.g., blocks of flowchart 500), model evaluation, etc., as described herein.

Property determination component 610 is configured to determine one or more properties associated with an entity, as described herein. Property determination component 610 may determine one or more properties and associated values associated with an entity based on analysis (e.g., including extraction of properties and values) of network traffic, as described herein. The properties can then be stored and used by other components (e.g., classification component 620, model training component 622, model selection component 624) for performing classification, training one or more models, evaluating one or more models, and performing actions (e.g., security actions), as described herein.

Classification component 620 is configured to determine one or more classifications or classification results, e.g., at different or various granularity levels, as described herein. Classification component 620 is further configured to determine a confidence associated with a classification (result), as described herein, which may then be compared with a confidence threshold, as described herein. Classification component 620 may further be configured to perform one or more additional classifications (e.g., using additional models) in response to a confidence threshold of a first classification being met or exceeded. The one or more additional classifications may be performed with increasingly or higher granularity models. Classification component 620 may use model selection component 624 to select one or more models for additional classification (e.g., during performing classification based on a tree, for instance, tree 300). Classification component 620 may further use profile libraries, entity or device fingerprints, etc., in conjunction or in place of classification using the one or more models, as described herein. Classification component 620 may use local resources (e.g., local classification engine 240), cloud resources (e.g., classification system 262), or a combination thereof for determining a classification result.

Model training component 622 is configured to train one or more models at various levels of granularity (e.g., blocks of flowchart 500), as described herein. The models trained by model training component 622 may be used by classification component 620 to classify an entity at one or more granularity levels, as described herein.

Model selection component 624 is configured to select a model for use by classification component 620, as described herein. Model selection component 624 may select a model based on one or more classification results (e.g. determined by classification component 620). For example, a model for classifying an entity as a type of OT entity may be selected based on an entity being classified as an OT entity by a previously used (e.g., less granular) model.

Display component 614 is configured to optionally display one or more graphical user interfaces or other interfaces (e.g., command line interface) for depicting various information associated with entities, classification, thresholds (e.g., confidence thresholds), and models, as described herein. In some embodiments, display component 614 may display or render a hierarchy of models (e.g., tree 300), a network graph of entities including one or more classifications, access rules associated with entities, and other access rule information (e.g., access policies, access templates, etc.).

Notification component 616 is operable to initiate one or more notifications based on the results of one or more classifications and other analysis of communications, as described herein. The notification may be any of a variety of notifications, e.g., IT ticket, email, SMS, a HTTP notification, etc., as described herein.

Policy component 618 is operable for initiating or triggering one or more remediation actions or security actions according to one or more policies, e.g., based on one or more classifications, as described herein. Policy component 618 may further be configured to perform other operations including checking compliance status, finding open ports, etc. In some embodiments, policy component 618 may verify that an assignment of one or more access rules to one or more enforcements points has been properly assigned or configured. Policy component 618 may restrict network access, signal a patch system or service, signal an update system or service, etc., as described herein. The policy component 618 may thus, among other things, invoke automatically (e.g., without user or human interaction) patching, automatically updating, and automatically restrict network access of an entity (e.g., that has out-of-date software or based on access rule violation or attempted violation).

The actions may include restricting network access to a particular level (e.g., full, limited, or no network access, for instance via an enforcement point), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

The system 600 may be software stored on a non-transitory computer readable medium having instructions encoded thereon that, when executed by a processing device, cause the processing device to access network traffic from a network. The network traffic may be associated with a plurality of entities. The instructions may further cause the processing device to select an entity and determine one or more values associated with one or more properties associated with the entity. The one or more values are accessed from the network traffic. The instructions may further cause the processing device to access a first model associated with a first level of granularity and determine, by the processing device, a first classification result of the entity based on the first model. The instructions may further cause the processing device to access a second model associated with a second level of granularity. The second level of granularity is higher than the first level of granularity and the second model is accessed based on the first classification result. The instructions may further cause the processing device to determine, by the processing device, a second classification result of the entity based on the second model and store at least one of the first classification result or the second classification result.

In some embodiments, the instructions may further cause the processing device to perform an action based on at least one of the first classification result or the second classification result. In various embodiments, the second model is accessed in response to a confidence associated with the first classification result being above a confidence threshold associated with the first model. In some embodiments, the second model was trained on a select set of properties associated with the second level of granularity. In various embodiments, the first model is operable to classify an entity as an information technology (IT) entity or an operational technology (OT) entity. In some embodiments, the second model is operable to classify an entity as a type of IT entity or a type of OT entity. In various embodiments, the first model is operable to classify an entity based on an operating system (OS) associated with the entity and the second model is operable to classify the entity based on a version associated with the OS associated with the entity. In some embodiments, a third model is operable to classify the entity based on a patch level associated with the OS associated with the entity.

Figure 7:
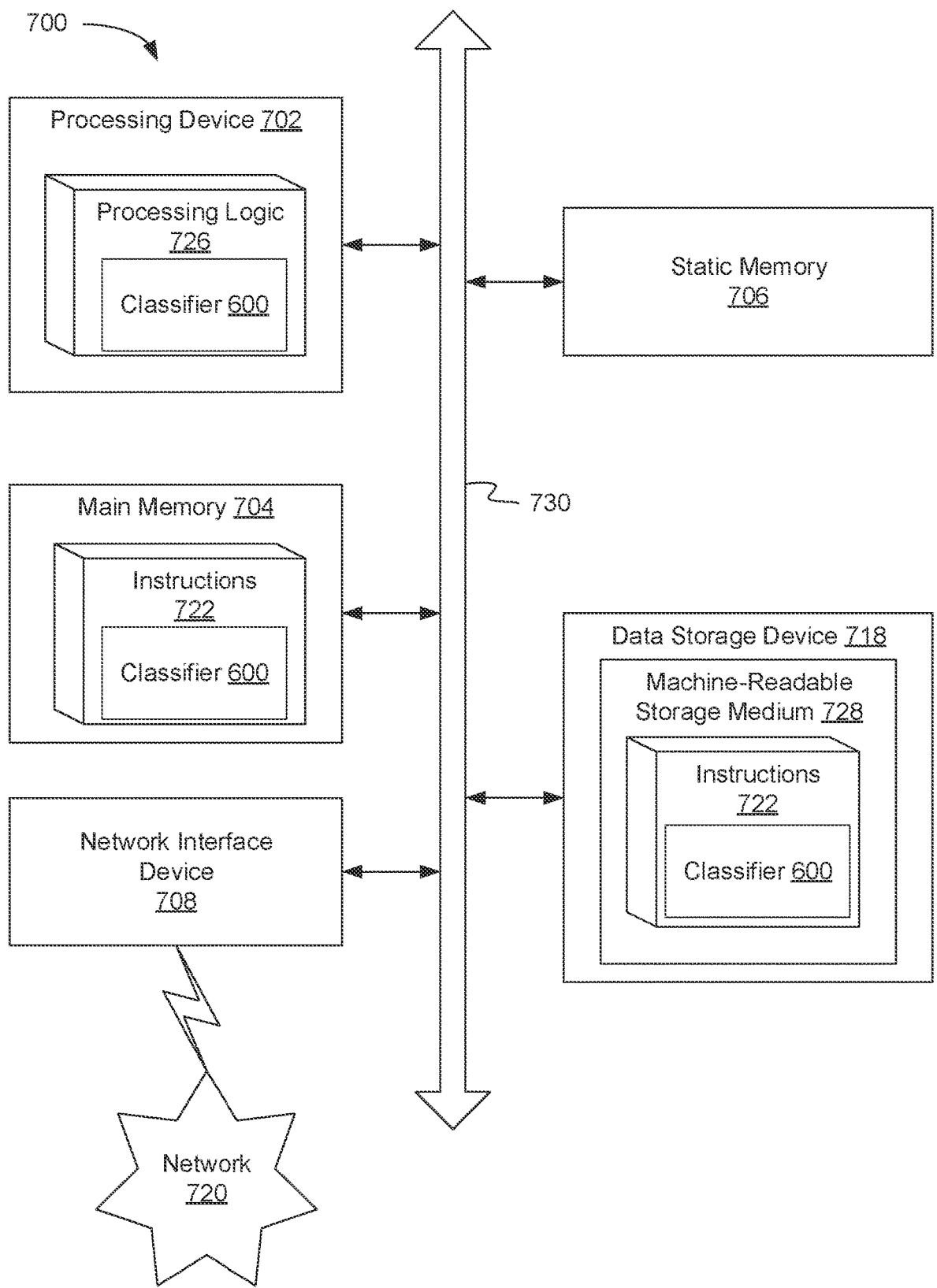
FIG. 7 is a block diagram illustrating an example computer system, in accordance with one implementation of the present disclosure.

FIG. 7 is a block diagram illustrating an example computer system, in accordance with one implementation of the present disclosure. FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server, such as network monitor device 102 running classifier 600 to perform classification at various granularities, as described herein. Classifier 600 may optionally train one or more models at various levels of granularity, as described herein.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of classifier 600 shown in FIG. 6, for performing the operations and steps discussed herein.

The data storage device 718 may include a machine-readable storage medium 728, on which is stored one or more set of instructions 722 (e.g., software) embodying any one or more of the methodologies of operations described herein, including instructions to cause the processing device 702 to execute classifier 600. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method for determining one or more classifications at various granularities, as described herein. The machine-readable storage medium 728 may also be used to store instructions to perform a method for training one or more models at various granularities, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   accessing network traffic from a network, wherein the network traffic is associated with a plurality of entities;
   selecting an entity of the plurality of entities;
   determining one or more values associated with one or more properties associated with the entity, wherein the one or more values are accessed from the network traffic;
   accessing a first model associated with a first level of granularity;
   determining, by a processing device, a first classification result of the entity based on the first model;
   accessing a second model associated with a second level of granularity, wherein the second level of granularity is higher than the first level of granularity and wherein the second model is accessed based on the first classification result;
   determining, by the processing device, a second classification result of the entity based on the second model; and
   storing at least one of the first classification result or the second classification result.

2. The method of claim 1 further comprising:
   performing an action based on at least one of the first classification result or the second classification result.

3. The method of claim 1, wherein the second model is accessed in response to a confidence associated with the first classification result being above a confidence threshold associated with the first model.

4. The method of claim 1, wherein the second model being trained on a select set of properties associated with the second level of granularity.

5. The method of claim 1, wherein the first model is operable to classify an entity as an information technology (IT) entity or an operational technology (OT) entity.

6. The method of claim 5, wherein the second model is operable to classify an entity as a type of IT entity or a type of OT entity.

7. The method of claim 1, wherein the first model is operable to classify an entity based on an operating system (OS) associated with the entity and the second model is operable to classify the entity based on a version associated with the OS associated with the entity.

8. The method of claim 7, wherein a third model is operable to classify the entity based on a patch level associated with the OS associated with the entity.

9. A system comprising:
a memory; and
a processing device, operatively coupled to the memory, to:
access network traffic from a network, wherein the network traffic is associated with a plurality of entities;
select an entity;
determine one or more values associated with one or more properties associated with the entity, wherein the one or more values are accessed from the network traffic;
access a first model associated with a first level of granularity;
determine, by the processing device, a first classification result of the entity based on the first model;
access a second model associated with a second level of granularity, wherein the second level of granularity is higher than the first level of granularity and wherein the second model is accessed based on the first classification result;
determine, by the processing device, a second classification result of the entity based on the second model; and
store at least one of the first classification result or the second classification result.

10. The system of claim 9, the processing device further to:
perform an action based on at least one of the first classification result or the second classification result.

11. The system of claim 9, wherein the second model is accessed in response to a confidence associated with the first classification result being above a confidence threshold associated with the first model.

12. The system of claim 9, wherein the second model being trained on a select set of properties associated with the second level of granularity.

13. The system of claim 9, wherein the first model is operable to classify an entity as an information technology (IT) entity or an operational technology (OT) entity.

14. The system of claim 13, wherein the second model is operable to classify an entity as a type of IT entity or a type of OT entity.

15. The system of claim 9, wherein the first model is operable to classify an entity based on an operating system (OS) associated with the entity and the second model is operable to classify the entity based on a version associated with the OS associated with the entity.

16. The system of claim 15, wherein a third model is operable to classify the entity based on a patch level associated with the OS associated with the entity.

17. A non-transitory computer readable medium having instructions encoded thereon that, when executed by a processing device, cause the processing device to:
access network traffic from a network, wherein the network traffic is associated with a plurality of entities;
select an entity;
determine one or more values associated with one or more properties associated with the entity, wherein the one or more values are accessed from the network traffic;
access a first model associated with a first level of granularity;
determine, by the processing device, a first classification result of the entity based on the first model;
access a second model associated with a second level of granularity, wherein the second level of granularity is higher than the first level of granularity and wherein the second model is accessed based on the first classification result;
determine, by the processing device, a second classification result of the entity based on the second model; and
store at least one of the first classification result or the second classification result.

18. The non-transitory computer readable medium of claim 17, wherein the instructions further cause the processing device to:
perform an action based on at least one of the first classification result or the second classification result.

19. The non-transitory computer readable medium of claim 17, wherein the second model is accessed in response to a confidence associated with the first classification result being above a confidence threshold associated with the first model.

20. The non-transitory computer readable medium of claim 17, wherein the second model being trained on a select set of properties associated with the second level of granularity.

* * * * *